April 1, 1958     B. T. BALLINGTON     2,829,240
HOLDERS FOR WELDING ELECTRODES
Filed Nov. 14, 1955
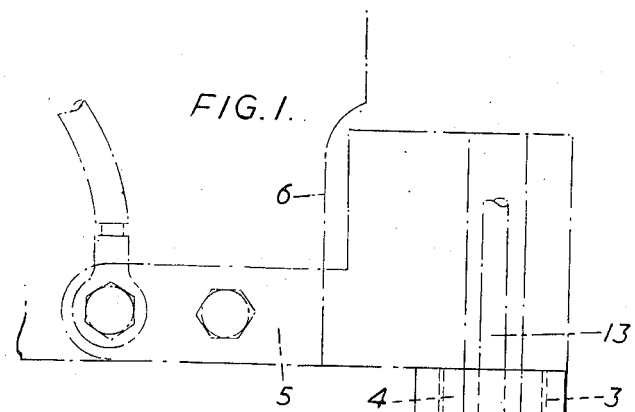
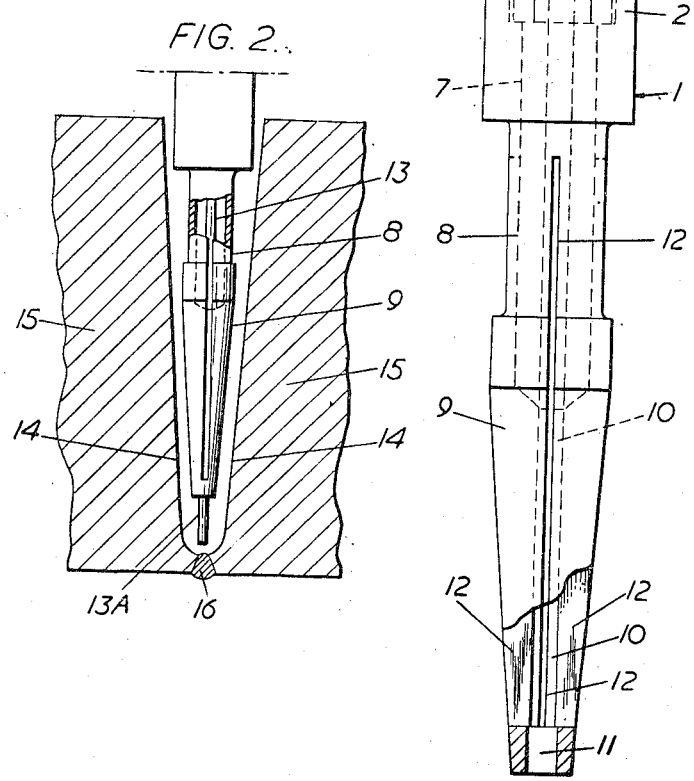
Inventor,
Bernard T. Ballington
By
Watson, Cole, Grindle & Watson
Attorneys

United States Patent Office 2,829,240
Patented Apr. 1, 1958

2,829,240

HOLDERS FOR WELDING ELECTRODES

Bernard T. Bailington, Sheffield, England, assignor to English Steel Corporation Limited, Sheffield, England Application November 14, 1955, Serial No. 546,640

4 Claims. (Cl. 219—136)

This invention relates to holders for welding electrodes, particularly, but not exclusively, applicable for use in machine welding with a "continuous" electrode.

One object of the invention is to provide a holder that will make an efficient grip with the electrode, and conduce to the maintenance of steady current. Another object is to provide a holder that is particularly well adapted for welding into a narrow angle. A further object is to provide a holder capable of effectively carrying very heavy welding currents.

According to the present invention, a holder for welding electrodes comprises a tubular gripper of conducting metal, with a bore adapted over at least the end from which the electrode emerges to fit closely the size of electrode to be used, there being a plurality of lengthwise slits in the tube each breaking into that end of the bore over a substantial length from that end of the gripper, so as to impart resiliency for gripping the electrode. Preferably, the slits start a little short of that end, so that the end does not tend to spread open as might arise with a gripper of small overall diameter. In such case, the mouth of the bore is preferably slightly larger in diameter than the slitted bore.

An electrode inserted in the bore is gripped by the resiliency of the parts of the lower end separated by the slits, and firm mechanical contact and good electrical contact is established between the electrode and the gripper by reason of the substantial length of engagement of the electrode with a resilient bore that closely fits the electrode. The electrical contact is, moreover, made close to the point at which the electrode emerges from the holder, so that only a short protruding length of the electrode itself is called on to carry the welding current.

The invention will now be described in greater detail with reference to the accompanying drawings, in which Figure 1 is a side elevation of a tubular electrode holder for machine welding; and Figure 2 is a diagrammatic view showing one example of the holder in use.

In Figure 1, the holder 1 comprises a head 2 tapped at 3 to receive a screwed boss 4 on a combined mechanical mounting and electrical contact member 5 carried by a part 6 of the welding machine. The head 2 has a wide bore 7 that continues through a neck 8 and ends in the upper end of a tapered portion 9. Through the neck 8, the wall surrounding the bore 7 is thick enough to provide a substantial annular section of metal for conducting heavy welding current along the holder.

A smaller bore 10 continues through the portion 9 and emerges into a slightly larger bore 11. From the inner end of the bore 11, four slits 12 extend along the portion 9 and into the neck 8, the slits being shown parallel to the length of the holder, but not necessarily so.

A "continuous" electrode 13 (see Figure 2) fed through the mounting 5, the boss 3, and the wide bore 7 is forced into the narrow bore 10 and is gripped resiliently over the length occupied by the slits 12, the daimeter of the bore 10 being appropriate to the diameter of the electrode, after making allowance for roughening of the electrode by the usual serrated feed-wheels (not shown) of the machine. Welding current is fed through the adequate section of metal in the neck 8 to the portion 9 of the holder containing the narrow gripping bore 10; and, good electrical contact being made over the whole length of the bore 10, and consequently the electrode 13 is not called on to carry the whole of the current until it has emerged from the outlet bore 11 at the tip of the holder.

The electrode has its surface roughened by its passage through the feed-wheels, the slight enlargement of section resulting from the roughening assists in making contact with the slitted bore, which tends to be slightly expanded by the electrode that is being pushed through it by the feed-wheels.

As shown in Figure 2, the holder may be introduced deep into the angular notch produced by the edge formation 14 of two parts 15 to be welded together, so that the protruding portion 13A of the electrode may be supported close to the bottom of the notch that has been completed by the preliminary run 16 of welding. This short protruding portion 13A is the only part of the electrode carrying the whole welding current, and its shortness avoids the pronounced vibration that arises in the white-hot long length of electrode protruding from the type of holder that cannot make any close approach to the welding point because of bulkiness caused by spring-urged contact pads.

A further advantage of the short protruding length is that the voltage can be held to a very steady value, instead of being subject to the wild variations resulting from a long length of white-hot vibrating electrode.

Again, there is avoided the disadvantage of a long length of highly heated electrode ploughing through the depth of flux that has been poured into the notch in advance of the holder.

The portion 9 with the slits 12 is preferably tapered, as shown, which facilitates penetration of the holder between workpieces several inches thick. The continuation of the slits 12 into the neck 8, with the larger bore 7, assists in providing resilience in the manner of a collet, and yet permits gripping of the electrode 13 over the whole length of the bore 10 in the portion 9.

As shown in Figure 1, the portion 9 is about one-half of the length of the complete gripper tube, the neck 8 being relatively short, but proportion of neck-length to total length may be varied considerably, and a longer neck may be provided as may be required by the thickness of work to be welded. The head 2 screwing on to a boss 4 on the welding machine to provide mechanical support and electrical contact is shown only by way of example, and many variations may be made as regards provision for connecting the gripper-tube holder to the machine. Thus, the tube may be screwed into a tapped bore of the machine, clamped into socket, or flanged for bolting to the machine. Again, it need not receive the current through its mechanical connection with the machine, e. g. it may be insulated from the supporting part of the machine and supplied with current through a cable directly connected to the holder itself. All such variations are within the scope of the invention as defined by the annexed claims.

The holder may be readily replaced, as may be required for electrodes of different diameters, as also when it becomes burnt by the welding operation.

What I claim is:

1. An electrode holder for use in a welding machine feeding a length of electrode through the holder, said holder comprising a tube, with a head at one end for securing the tube to the machine, a large bore from the head end of the tube, a small bore continuing from the large bore over a substantial length to just short of the other end of the tube, a plurality of lengthwise slits each breaking into the small bore, and a short unslitted bore at that other end of the tube of slightly larger diameter than the small bore, the unslitted end of the tube ensuring maintenance close to that end of the tube of the resilient grip provided by the slitted small bore on an electrode fitting the slitted small bore.

2. An electrode holder for use in a welding machine feeding a length of electrode through the holder, said holder comprising a tube, with a head at one end for securing the tube to the machine, a large bore from the head end of the tube, a neck from the head over part of the length of the large bore, a small bore continuing from the large bore over a substantial length to just short of the other end of the tube, a plurality of lengthwise slits each breaking into the small bore and into the neck portion of the large bore, and a short unslitted bore at that other end of the tube of slightly larger diameter than the small bore, the unslitted end of the tube ensuring maintenance close to that end of the tube of the resilient grip provided by the slits along the small bore and into the neck portion on an electrode fitting the slitted small bore.

3. An electrode as in claim 2, wherein the tube tapers from the neck over the length of the slitted small bore to the end of the tube with the unslitted bore.

4. A holder for welding electrodes comprising a tubular gripper of conducting metal with a parallel axial bore of small diameter extending over a substantial length from the end of the gripper from which the electrode emerges to receive and fit closely over a substantial length an electrode of a size corresponding to that bore, the bore being slightly enlarged over a short distance from that end and having lengthwise slits starting short of that end and breaking into the bore over its remaining length so as to provide a resilient grip on the length of the electrode fitting the slitted bore.

References Cited in the file of this patent

UNITED STATES PATENTS

| | | |
|---|---|---|
| 1,644,237 | Christensen | Oct. 4, 1927 |
| 2,289,938 | Smith | July 14, 1942 |
| 2,379,470 | Baird | July 3, 1945 |
| 2,422,265 | Squires | June 17, 1947 |